(12) United States Patent
Zhao et al.

(10) Patent No.: US 12,448,709 B2
(45) Date of Patent: Oct. 21, 2025

(54) ENHANCED FLASH EVAPORATION/ELECTROSPINNING COMPOSITE SPINNING EQUIPMENT

(71) Applicant: Shanghai Xunjiang Technology Co., Ltd., Shanghai (CN)

(72) Inventors: Xinglei Zhao, Shanghai (CN); Ting Hua, Shanghai (CN); Pan Jiang, Shanghai (CN); Peng Wang, Shanghai (CN)

(73) Assignee: Shanghai Xunjiang Technology Co., Ltd., Shanghai (CN)

( * ) Notice: Subject to any disclaimer, the term of this patent is extended or adjusted under 35 U.S.C. 154(b) by 0 days.

(21) Appl. No.: 18/856,077

(22) PCT Filed: Feb. 24, 2023

(86) PCT No.: PCT/CN2023/078040
§ 371 (c)(1),
(2) Date: Oct. 11, 2024

(87) PCT Pub. No.: WO2023/207293
PCT Pub. Date: Nov. 2, 2023

(65) Prior Publication Data
US 2025/0116042 A1    Apr. 10, 2025

(30) Foreign Application Priority Data

Apr. 28, 2022 (CN) .......................... 202210483766.4

(51) Int. Cl.
*D01D 5/00* (2006.01)
*D01D 4/00* (2006.01)
(Continued)

(52) U.S. Cl.
CPC ........... *D04H 1/43838* (2020.05); *D01D 4/00* (2013.01); *D01D 5/0038* (2013.01);
(Continued)

(58) Field of Classification Search
CPC ...... D01D 4/00; D01D 5/0038; D01D 5/0069; D01D 5/11; D04H 1/558; D04H 1/56;
(Continued)

(56) References Cited

U.S. PATENT DOCUMENTS 5,227,107 A * 7/1993 Dickenson ........ A61F 13/15658
264/510
5,816,700 A * 10/1998 Starke, Sr. .............. B29C 48/37
366/147
(Continued)

FOREIGN PATENT DOCUMENTS

CN    105568551 A    5/2016
CN    107740198 A    2/2018
(Continued)

OTHER PUBLICATIONS

English translation of JP 2021-147901, Sep. 29, 2021. (Year: 2021).*
(Continued)

*Primary Examiner* — Xiao S Zhao
*Assistant Examiner* — Joseph S Leyson
(74) *Attorney, Agent, or Firm* — Bayramoglu Law Offices LLC

(57) ABSTRACT

An enhanced flash evaporation/electrospinning composite spinning equipment includes a flash spinning equipment, an electrospinning equipment, and a grounded receiving conveyor belt; the flash spinning equipment includes a flash spinning spinneret unit, the flash spinning spinneret unit includes a first spinneret, and the first spinneret is grounded; the electrospinning equipment includes a high-voltage power supply and an electrospinning spinneret unit, the electrospinning spinneret unit includes a second spinneret, and the second spinneret is connected to the high-voltage power supply; the first spinneret and the second spinneret (Continued)

are both located above the receiving conveyor belt at opposite positions with a distance of D, and the value range of D is 15-40 cm. The enhanced flash evaporation/electrospinning composite spinning equipment has a simple structure, and can prepare products that are not easy to delaminate, and excellent in waterproof performance and air permeability.

8 Claims, 2 Drawing Sheets

(51) Int. Cl.
    *D01D 5/11*     (2006.01)
    *D01F 1/10*     (2006.01)
    *D01F 6/46*     (2006.01)
    *D01F 6/48*     (2006.01)
    *D01F 6/54*     (2006.01)
    *D01F 6/94*     (2006.01)
    *D04H 1/4282*     (2012.01)
    *D04H 1/4291*     (2012.01)
    *D04H 1/43*     (2012.01)
    *D04H 1/4318*     (2012.01)
    *D04H 1/4358*     (2012.01)
    *D04H 1/4382*     (2012.01)
    *D04H 1/558*     (2012.01)
    *D04H 1/56*     (2006.01)
    *D04H 1/724*     (2012.01)
    *D04H 1/728*     (2012.01)
    *D04H 1/732*     (2012.01)
    *D04H 1/736*     (2012.01)
    *D04H 3/033*     (2012.01)

(52) U.S. Cl.
CPC ............ *D01D 5/0069* (2013.01); *D01D 5/11* (2013.01); *D01F 1/10* (2013.01); *D01F 6/46* (2013.01); *D01F 6/48* (2013.01); *D01F 6/54* (2013.01); *D01F 6/94* (2013.01); *D04H 1/4282* (2013.01); *D04H 1/4291* (2013.01); *D04H 1/43* (2013.01); *D04H 1/4318* (2013.01); *D04H 1/4358* (2013.01); *D04H 1/43835* (2020.05); *D04H 1/558* (2013.01); *D04H 1/56* (2013.01); *D04H 1/565* (2013.01); *D04H 1/724* (2013.01); *D04H 1/728* (2013.01); *D04H 1/732* (2013.01); *D04H 1/736* (2013.01); *D04H 3/033* (2013.01); *D10B 2321/021* (2013.01); *D10B 2321/042* (2013.01); *D10B 2321/06* (2013.01); *D10B 2321/10* (2013.01); *D10B 2331/10* (2013.01); *D10B 2331/14* (2013.01); *D10B 2401/022* (2013.01); *D10B 2401/063* (2013.01); *D10B 2401/10* (2013.01)

(58) Field of Classification Search
CPC ........ D04H 1/565; D04H 1/724; D04H 1/728; D04H 1/732; D04H 1/736; D04H 3/033
See application file for complete search history.

(56) References Cited

U.S. PATENT DOCUMENTS

2009/0325449 A1* 12/2009 Kim .................. D01F 6/60
                                                         425/174
2013/0189892 A1* 7/2013 Boscolo ............ D01D 5/092
                                                         442/337

FOREIGN PATENT DOCUMENTS

| CN | 209162258 U | | 7/2019 |
|---|---|---|---|
| CN | 110528172 A | | 12/2019 |
| CN | 112981718 A | | 6/2021 |
| CN | 114892288 A | | 8/2022 |
| JP | 2012001865 A | | 1/2012 |
| JP | 2021147901 A | * | 9/2021 |
| KR | 100874982 B1 | | 12/2008 |

OTHER PUBLICATIONS

GB/T4744, Textiles—Testing and evaluation for water resistance—Hydrostatic pressure method, General Administration of Quality Supervision, Inspection and Quarantine of the People; Republic of China & Standardization Administration of the People's Republic of China, 2013, pp. 1-3, China National Standards.

GB/T 328.9, Test methods for building sheets for water proofing Part 9 : Plastic and rubber sheets for waterproofing-tensile properties, General Administration of Quality Supervision, Inspection and Quarantine of the People; Republic of China & Standardization Administration of the People's Republic of China, 2007, pp. 1-4, China National Standards.

GB/T17146, Test methods for water vapour transmission properties of Building materials and product, General Administration of Quality Supervision, Inspection and Quarantine of the People; Republic of China & Standardization Administration of the People's Republic of China, 2015, pp. 1-31, China National Standards.

* cited by examiner

ENHANCED FLASH EVAPORATION/ELECTROSPINNING COMPOSITE SPINNING EQUIPMENT

CROSS REFERENCE TO THE RELATED APPLICATIONS

This application is the national phase entry of International Application No. PCT/CN2023/078040, filed on Feb. 24, 2023, which is based upon and claims priority to Chinese Patent Application No. 202210483766.4, filed on Apr. 28, 2022, the entire contents of which are incorporated herein by reference.

TECHNICAL FIELD

The present invention belongs to the technical field of new materials and new equipment, and more particularly, relates to an enhanced flash evaporation/electrospinning composite spinning equipment.

BACKGROUND

The ultra-high molecular weight polyethylene material prepared by separate flash evaporation spinning has excellent strength, waterproof performance, and air permeability, and has been widely used in many fields such as medical care, packaging, and construction. However, the problems of easy delamination, relatively low waterproof performance, and relatively low air permeability when used in specific fields also limit the further development of its performance.

CN201710805631.4 discloses a flash spinning equipment and a spinning method thereof, which provides a secondary stretching technique to make the fiber diameter thinner to enhance performance, but the entanglement degree and porosity of the material prepared by this method are still poor, and the existing problems cannot be fundamentally solved.

Therefore, it is of great significance to study the preparation of a flash spinning/electrospinning composite ultrafine nanofiber material to solve the problems of easy delamination, relatively low waterproof performance, and relatively low air permeability of the original material.

SUMMARY

In view of the problems existing in the prior art, the present invention provides a preparation method of a flash spinning/electrospinning composite ultrafine nanofiber material and an enhanced flash evaporation/electrospinning composite spinning equipment.

To this end, the technical schemes of the invention are as follows:

A preparation method of a flash spinning/electrospinning composite ultrafine nanofiber material, in the process of preparing nanofibers by electrospinning and microfibers by flash spinning, the nozzle of electrospinning and the nozzle of flash spinning are above the receiving conveyor belt at the same time, and the two are in the relative position with a distance of 15-40 cm, and at the same time, the nozzle of electrospinning is connected to the high-voltage power supply, and the nozzle of flash spinning and the receiving conveyor belt are grounded to prepare the flash spinning/electrospinning composite ultrafine nanofiber material; wherein if the distance is too small, the strong airflow generated by flash evaporation will blow away the nanofibers formed by electrospinning, if the distance is too large, the microfibers formed by the flash spinning and the nanofibers formed by the electrospinning will not be mixed; it should be noted that, although the nozzle of electrospinning and the nozzle of flash spinning are opposite to each other, the electrospinning fibers will eventually be deposited on the receiving conveyor belt rather than the nozzle of flash spinning, because the flash evaporation is an instant release of pressure, there will be a strong airflow, just like a pressure cooker releasing pressure, so blowing directly against the nanofibers will change the direction of the oncoming nanofibers, thus mixing with the flash spinning fibers randomly and finally sinking to the conveyor belt by gravity, so that the flash spinning fibers will eventually be deposited on the receiving conveyor belt rather than the nozzle of electrospinning, because the high electric field generated by electrospinning will make the flash spinning fibers charged, which is opposite to the direction of the electric field force and relies on the electric field force to change its direction.

The following preferred technology program is presented to give a detailed description for this invention:

The said preparation method of a flash spinning/electrospinning composite ultrafine nanofiber material, wherein the electrospinning solution includes a polymer I and a solvent I, the polymer I is polyethylene, polyvinylidene fluoride, polyacrylonitrile, polyurethane or polyvinyl butyral, and the solvent I is dimethylformamide (DMF), dimethylacetamide (DMAc), dichloromethane, 1H,6H-perfluorohexane, n-pentane or cyclopentane, and the concentration of the polymer I in the electrospinning solution is 2-40 wt %.

The said preparation method of a flash spinning/electrospinning composite ultrafine nanofiber material, wherein the electrospinning solution, also includes a hydrophobic agent, which is an organosilicon hydrophobic agent, a carbon six hydrophobic agent, or a carbon eight hydrophobic agent, and the concentration of the hydrophobic agent in the electrostatic spinning solution is 0.5-5 wt %; the addition of the hydrophobic agent in the electrostatic spinning solution enables the nanofibers to have a super-hydrophobicity, with a water contact angle >150°, thereby further improving the hydrophobic properties of the flash spinning/electrospinning composite ultrafine nanofiber materials and having higher water pressure resistance; the invention can also add the hydrophobic agent in the flash spinning solution, but because the fibers formed by flash evaporation are at the micron level, the pores diameter formed between fibers are larger, even if the addition of the hydrophobic agent on the enhancement of its water pressure resistance is limited, while electrospinning fibers are at the nano level, the pore diameter formed is greatly reduced, at this point, the small pores+superhydrophobic can achieve a great increase in water pressure resistance, so it is preferred to add hydrophobic agents only in the electrospinning solution.

The said preparation method of a flash spinning/electrospinning composite ultrafine nanofiber material, wherein the process parameters of the electrospinning include: a solution supply speed of 1-10 mL/min, a spinning voltage of 30-100 kV, an ambient temperature of 23-25° C., and an ambient relative humidity of 20-90%; wherein the process of electrospinning is: the electrospinning solution is transported to the spinneret through an infusion pump, and a high voltage electricity is applied to the spinneret to generate nanofibers.

The said preparation method of a flash spinning/electrospinning composite ultrafine nanofiber material, wherein the flash spinning solution comprises 2-35 wt % of polymer II and a residual amount of solvent II, the polymer II is polyethylene, which has a melt index of 0.7 g/10 min at a temperature of 160° C. and a loading of 5 kg, and has a melting point of 133° C.; the solvent II is dichloromethane, 1H,6H-perfluorohexane, n-pentane or cyclopentane.

The said preparation method of a flash spinning/electrospinning composite ultrafine nanofiber material, wherein the process parameters of the flash spinning include: a reaction pressure of 8-30 MPa, a reaction temperature of 150-300° C., and a stirring speed of 500-1500 rpm; wherein the process of flash spinning is: polymer II and solvent II are transported to the reactor by means of an automatic feeding system, the reactor is pressurized to 8-30 MPa and heated to 150-300° C., and after reaching the set parameters, the pressure release valve is opened, the pressure is released instantly, and the solution is ejected through the spinneret hole after passing through the pressure reduction chamber to form microfibers.

The said preparation method of a flash spinning/electrospinning composite ultrafine nanofiber material, during electrospinning, the jet ejected from the electrospinning nozzle is subjected to irregular airflow blowing; during flash spinning, the jet ejected from the flash spinning nozzle is subjected to irregular airflow blowing.

The said preparation method of a flash spinning/electrospinning composite ultrafine nanofiber material, during electrospinning, the solvent concentration in the environment of the spinning area is controlled so that the solvent concentration in the environment gradually increases along the direction of the jet flow, and the concentration is gradually increased mainly to compensate for the decrease in solvent concentration far away from the spinneret.

The said preparation method of a flash spinning/electrospinning composite ultrafine nanofiber material, after the electrospinning and flash spinning are completed, the whole composed of nanofibers and microfibers is also hot-pressed, the hot-pressing temperature is between the melting point of the nanofibers and the melting point of the microfibers, and the time is 0.2-0.7 min; the purpose of hot-pressing is to produce strong bonding between the fibers, and the hot-pressing time should not be too long, otherwise the fiber will become brittle, and the hot-pressing time should not be too short, otherwise the effect is not good.

The present invention also provides a flash spinning/electrospinning composite ultrafine nanofiber material prepared by the said preparation method of a flash spinning/electrospinning composite ultrafine nanofiber material, wherein the flash spinning/electrospinning composite ultrafine nanofiber material has an overall membrane structure and is composed of nanofibers and microfibers; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 1:5-2:5.

The following preferred technology program is presented to give a detailed description for this invention:

The said flash spinning/electrospinning composite ultrafine nanofiber material, wherein the average diameter of the nanofibers is 50-800 nm, and the average diameter of the microfibers is 1-20 μm; the flash spinning/electrospinning composite ultrafine nanofiber material has a strength (the test method refers to GB/T328.9-2007)>100 N/50 mm, a porosity >55%, a moisture permeability (the test method refers to GB/T17146)>800 g/m² in 24 hours, and a water pressure resistance (the test method refers to GB/T 4744-2013)>5 kPa.

The present invention also provides an enhanced flash evaporation/electrospinning composite spinning equipment, includes a flash spinning equipment, an electrospinning equipment, and a grounded receiving conveyor belt;
  wherein the flash spinning equipment includes a flash spinning spinneret unit, the flash spinning spinneret unit includes a first spinneret, and the first spinneret is grounded; wherein the electrospinning equipment includes a high-voltage power supply and an electrospinning spinneret unit, the electrospinning spinneret unit includes a second spinneret, and the second spinneret is connected to the high-voltage power supply;
  wherein the first spinneret and the second spinneret are both located above the receiving conveyor belt at opposite positions with a distance of D, and the value range of D is 15-40 cm; if the distance is too small, the strong airflow generated by the flash evaporation spinning will blow away the nanofibers formed by the electrospinning; if the distance is too large, the microfibers formed by the flash evaporation spinning and the nanofibers formed by the electrospinning cannot be mixed.

The following preferred technology program is presented to give a detailed description for this invention:

The said enhanced flash evaporation/electrospinning composite spinning equipment, wherein the flash spinning equipment further includes a first blowing device; wherein the electrospinning equipment further includes a second blowing device; the function of the first blowing device is to make the microfibers produced by flash spinning spray irregularly, so that the fibers formed have more entangled structures, which makes the bonding force between the fibers after hot-pressing is greatly enhanced, thereby enhancing the strength of the fiber material; the function of the second blowing device is also to make the nanofibers produced by electrospinning spray irregularly, so that the fibers are entangled between the fibers as well as entangled with the flash spinning fibers;
  wherein the first blowing device or the second blowing device includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; wherein the inner cylinder randomly distributes a plurality of spinneret holes;
  wherein a distance between the vertical plate II of the first blowing device 4 and the vertical plate II of the second blowing device 12 is X, and X is greater than 0;
  wherein the vertical plate I of the first blowing device is sleeved on the first spinneret, so that a jet ejected from the spinneret enters the inner cylinder of the first blowing device, since irregular airflow entering the inner cylinder, the direction of the jet forming the fiber bundle will be changed, so that it will be ejected irregularly; wherein the vertical plate I of the second blowing device is sleeved on the second spinneret, so that a jet ejected from the spinneret enters the inner cylinder of the second blowing device, since irregular airflow entering the inner cylinder, the direction of the jet forming the fiber bundle will be changed, so that it will be ejected irregularly.

The said enhanced flash evaporation/electrospinning composite spinning equipment, wherein an outer diameter of the inner cylinder is 0.5-3 m, an inner diameter of the outer cylinder is 0.3-2.7 m, and a wall thickness of the inner or outer cylinder is 0.1-0.3 m; wherein the air supply device is used to provide an airflow with a pressure of 2-30 MPa; wherein the diameter of the spinneret holes is 0.4-1 mm, and the number of the spinneret holes is 500-300.

The said enhanced flash evaporation/electrospinning composite spinning equipment, wherein the inner cylinder of the first blowing device is coaxial with the inner cylinder of the second blowing device, the distance between the vertical plate II of the first blowing device and the first spinneret is equal to the vertical plate II of the second blowing device and the second spinneret, and X is 30%-60% of D.

The said enhanced flash evaporation/electrospinning composite spinning equipment, wherein the electrospinning equipment further comprises a solvent atomization generator for atomizing a liquid solvent; wherein the second blowing device further comprises a plurality of partition plates, the partition plates are parallel to the vertical plate I of the second blowing device, and said plurality of partition plates divides the sealed cavity of the second blowing device into a plurality of sub-sealed cavities of the same size; wherein the number of intake holes on the outer cylinder of the second blowing device is multiple, each sub-sealed cavity is connected to at least one intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator; the present invention releases different amounts of solvents in the spinning area by controlling the air volume, so as to achieve the purpose of controlling the solvent concentration in the environment; along the direction of the jet, the solvent concentration in the environment gradually increases, which can slow down the volatilization rate of the solvent, so that the nanofibers are in a bonding state, when in contact with the flash spinning fibers, they can generate a bonding structure with the flash spinning fibers, after hot-pressing, the bonding strength between the fibers will be greatly increased.

The said enhanced flash evaporation/electrospinning composite spinning equipment, wherein the flash spinning equipment further includes a polymer tank, a solvent tank and a high-temperature and high-pressure reactor, wherein the polymer tank, the solvent tank, and the flash spinning spinneret unit are connected to the high-temperature and high-pressure reactor at the same time.

The said enhanced flash evaporation/electrospinning composite spinning equipment, wherein the electrospinning equipment further includes an electrospinning solution reservoir connected to the electrospinning spinneret unit.

The said enhanced flash evaporation/electrospinning composite spinning equipment, wherein a distance between the first spinneret or the second spinneret and the receiving conveyor belt is 10-60 cm; such a setting can avoid being easily affected by airflow blowing due to the distance being too small, and the fibers are not dispersed thoroughly in the air, resulting in the decrease of irregularity and affecting the film strength, and it can also avoid low production efficiency due to the distance being too large.

The said enhanced flash evaporation/electrospinning composite spinning equipment, wherein the enhanced flash evaporation/electrospinning composite spinning equipment further comprises a hot-pressing upper roller and a hot-pressing lower roller located on the upper and lower sides of the receiving conveyor belt.

The principle of the invention is as follows:

In the process of preparing nanofibers by electrospinning and microfibers by flash spinning, the present invention controls the electrospinning nozzle and the flash spinning nozzle to be in opposite positions, because the flash evaporation in the instantaneous release of pressure make the solvent evaporate quickly and the fiber dry immediately; since the polymer is a non-conductive substance, it is easy for the single fiber to be charged when there is an electrostatic field on the opposite side, and the single fiber repels each other after being charged to form an electrostatic repulsion; therefore, the microfibers prepared by the flash evaporation under the action of electrospinning electrostatic force, show various irregular distribution states, including entangled, curled and interpenetrating structures; the nanofibers are evenly interspersed and distributed in microfibers, and some of nanofibers form entanglements and interpenetrations with flashing microfibers, to obtain a flash spinning/electrospinning composite ultrafine nanofiber material.

Firstly, the connection sites, entanglements, and interpenetrating structures do not overlap with the performance sites of crude fibers prepared by flash spinning alone, which greatly increases the number of effective sites (by 20-50%), the greater the number of effective sites, the greater the strength of the final fiber membrane; after high-temperature hot-pressing, the strong bonding occurs between the flash spinning thick fibers, and at the same time, the electrospinning nanofibers and the intricate network cross-bonding structure formed between nanofibers and thick fibers greatly improves the strength of the overall composite material.

Secondly, the flash spinning/electrospinning composite ultrafine nanofiber material have a significantly higher degree of entanglement between fibers than microfibers produced by flash spinning; the entanglement includes horizontal entanglement and vertical entanglement, the more horizontal entanglements, the greater the strength, while the more vertical entanglements, the greater the number of fiber cohesion before different layers, the stronger the cohesion force, and the less likely to delaminate, which effectively solves the problem of the microfibers produced by the flash spinning are prone to delamination.

Finally, compared to the microfibers produced by flash spinning, the flash spinning/electrospinning composite ultrafine nanofiber material adds a certain amount of nanofibers, or the nanofibers further contain the hydrophobic agent; the hydrophobicity of nanofibers are increased after hydrophobic modification, at the same time, the small pore structure between nanofibers is conducive to the increase of water pressure resistance, and the porosity of nanofibers is increased, which greatly enhances the moisture permeability, so the flash spinning/electrospinning composite ultrafine nanofiber material has excellent waterproof performance and air permeability, effectively solving the problems of relatively low waterproof performance, and relatively low air permeability of the microfibers produced by flash spinning.

Benefits (3) The flash spinning/electrospinning composite ultrafine nanofiber material of the invention, greatly improves the strength of the overall composite material, and has excellent water pressure resistance and excellent moisture permeability, providing a new solution for expanding and improving its application performance in packaging materials and building materials;

(4) The enhanced flash evaporation/electrospinning composite spinning method of the invention, enhances the entanglement structure, bonding sites, fiber hydrophobicity and porosity between fibers, thereby greatly improving the application performance of the material.

Figure 1:
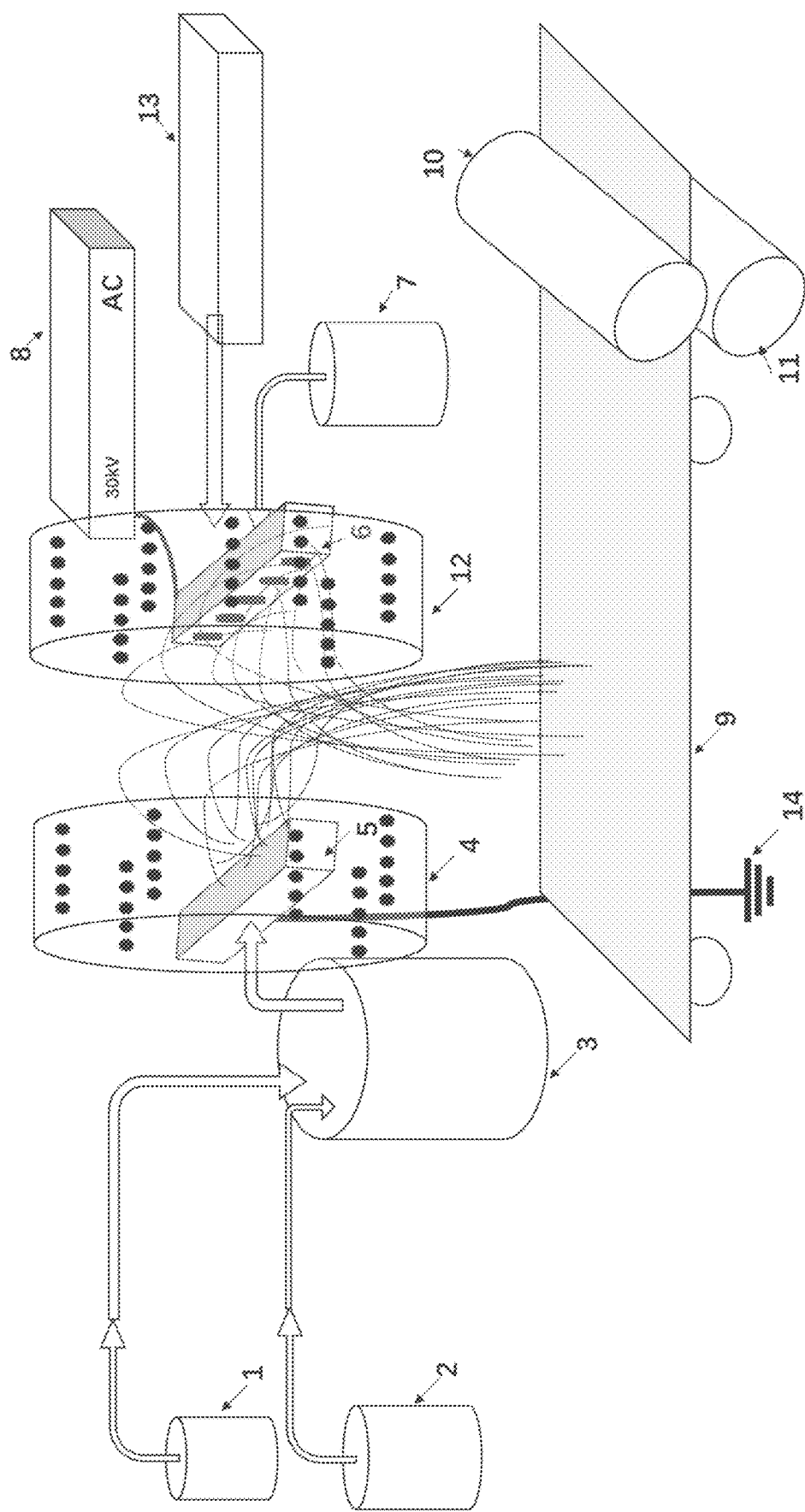
FIG. 1 is a schematic diagram of the structure of the enhanced flash evaporation/electrospinning composite spinning equipment in the invention.

wherein the numbers in the figures are respectively represented: 1—polymer tank, 2—solvent tank, 3—high-temperature and high-pressure reactor, 4—first blowing device, 5—flash spinning spinneret unit, 6—electrospinning spinneret unit, 7—electrospinning solution reservoir, 8—high-voltage power supply, 9—receiving conveyor belt, 10—hot-pressing upper roller, 11—hot-pressing lower roller, 12—second blowing device, 13—solvent atomization generator, and 14—earth wire.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

A preparation method of a flash spinning/electrospinning composite ultrafine nanofiber material, the process is as follows:

In the process of preparing nanofibers by electrospinning and microfibers by flash spinning, the nozzle of electrospinning and the nozzle of flash spinning are above the receiving conveyor belt at the same time, and the two are in the relative position with a distance of 15-40 cm, and at the same time, the nozzle of electrospinning is connected to the high-voltage power supply, and the nozzle of flash spinning and the receiving conveyor belt are grounded to prepare the flash spinning/electrospinning composite ultrafine nanofiber material;

the electrospinning solution includes a polymer I and a solvent I, the polymer I is polyethylene, polyvinylidene fluoride, polyacrylonitrile, polyurethane or polyvinyl butyral, and the solvent I is dimethylformamide (DMF), dimethylacetamide (DMAc), dichloromethane, 1H,6H-perfluorohexane, n-pentane or cyclopentane, and the concentration of the polymer I in the electrospinning solution is 2-40 wt %; preferably, the electrospinning solution, also includes a hydrophobic agent, which is an organosilicon hydrophobic agent, a carbon six hydrophobic agent, or a carbon eight hydrophobic agent, and the concentration of the hydrophobic agent in the electrostatic spinning solution is 0.5-5 wt %;

the process parameters of the electrospinning include: a solution supply speed of 1-10 mL/min, a spinning voltage of 30-100 kV, an ambient temperature of 23-25° C., and an ambient relative humidity of 20-90%;

the flash spinning solution comprises 2-35 wt % of polymer II and a residual amount of solvent II, the polymer II is polyethylene, which has a melt index of 0.7 g/10 min at a temperature of 160° C. and a loading of 5 kg, and which has a melting point of 133° C.; the solvent II is dichloromethane, 1H,6H-perfluorohexane, n-pentane or cyclopentane;

the process parameters of the flash spinning include: a reaction pressure of 8-30 MPa, a reaction temperature of 150-300° C., and a stirring speed of 500-1500 rpm;

preferably, during electrospinning, the jet ejected from the electrospinning nozzle is subjected to irregular airflow blowing; during flash spinning, the jet ejected from the flash spinning nozzle is subjected to irregular airflow blowing;

preferably, during electrospinning, the solvent concentration in the environment of the spinning area is controlled so that the solvent concentration in the environment gradually increases along the direction of the jet flow;

preferably, after the electrospinning and flash spinning are completed, the whole composed of nanofibers and microfibers is also hot-pressed, the hot-pressing temperature is between the melting point of the nanofibers and the melting point of the microfibers, and the time is 0.2-0.7 min.

The finally prepared flash spinning/electrospinning composite ultrafine nanofiber material has an overall membrane structure and is composed of nanofibers and microfibers; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 1:5-2:5; the average diameter of the nanofibers is 50-800 nm, and the average diameter of the microfibers is 1-20 μm; the flash spinning/electrospinning composite ultrafine nanofiber material has a strength >100 N/50 mm, a porosity >55%, a moisture permeability >800 g/m$^2$ in 24 hours, and a water pressure resistance >5 kPa.

The said preparation method of a flash spinning/electrospinning composite ultrafine nanofiber material can be realized by relying on a variety of equipments, and there is no limitation on the specific equipment to be used, as long as the preparation method is the same as the above, it is within the scope of protection of the present invention. Now, one of the equipments is exemplarily described.

An enhanced flash evaporation/electrospinning composite spinning equipment, as shown in FIG. 1, includes a flash spinning equipment, an electrospinning equipment, and a grounded receiving conveyor belt 9;

the flash spinning equipment includes a flash spinning spinneret unit 5, a polymer tank 1, a solvent tank 2 and a high-temperature and high-pressure reactor 3, the polymer tank 1, the solvent tank 2, and the flash spinning spinneret unit 5 are connected to the high-temperature and high-pressure reactor 3 at the same time, the flash spinning spinneret unit 5 includes a first spinneret, and the first spinneret is grounded;

the electrospinning equipment includes a high-voltage power supply 8, an electrospinning spinneret unit 6, and an electrospinning solution reservoir 7 connected to the electrospinning spinneret unit 6, the electrospinning spinneret unit 6 includes a second spinneret, and the second spinneret is connected to the high-voltage power supply 8;

the first spinneret and the second spinneret are both located above the receiving conveyor belt 9 at opposite positions with a distance of D, and the value range of D is 15-40 cm, the distance between the first spinneret or the second spinneret and the receiving conveyor belt 9 is 10-60 cm;

preferably, the flash spinning equipment further includes a first blowing device 4; the electrospinning equipment further includes a second blowing device 12; the first blowing device 4 or the second blowing device 12 includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; wherein the inner cylinder randomly distributes a plurality of spinneret holes; the distance between the vertical plate II of the first blowing device 4 and the vertical plate II of the second blowing device 12 is X, and X is greater than 0; the vertical plate I of the first blowing device 4 is sleeved on the first spinneret, so that a jet ejected from the spinneret enters the inner cylinder of the first blowing device 4; the vertical plate I of the second blowing device 12 is sleeved on the second spinneret, so that a jet ejected from the spinneret enters the inner cylinder of the second blowing device 12;

more preferably, an outer diameter of the inner cylinder is 0.5-3 m, an inner diameter of the outer cylinder is 0.3-2.7 m, and a wall thickness of the inner or outer cylinder is 0.1-0.3 m; wherein the air supply device is used to provide an airflow with a pressure of 2-30 MPa; wherein the diameter of the spinneret holes is 0.4-1 mm, and the number of the spinneret holes is 500-300;

more preferably, the inner cylinder of the first blowing device is coaxial with the inner cylinder of the second blowing device, the distance between the vertical plate II of the first blowing device 4 and the first spinneret is equal to the vertical plate II of the second blowing device 12 and the second spinneret, and X is 30%-60% of D;

preferably, the electrospinning equipment further includes a solvent atomization generator 13 for atomizing a liquid solvent; wherein the second blowing device 12 further includes a plurality of partition plates, the partition plates are parallel to the vertical plate I of the second blowing device 12, and said plurality of partition plates divides the sealed cavity of the second blowing device 12 into a plurality of sub-sealed cavities of the same size; wherein the number of intake holes on the outer cylinder of the second blowing device 12 is multiple, each sub-sealed cavity is connected to at least one intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator 13;

preferably, the enhanced flash evaporation/electrospinning composite spinning equipment further includes a hot-pressing upper roller 10 and a hot-pressing lower roller 11 located on the upper and lower sides of the receiving conveyor belt 9.

The said enhanced flash evaporation/electrospinning composite spinning equipment, and the process of using the said enhanced flash evaporation/electrospinning composite spinning equipment to prepare flash spinning/electrospinning composite ultrafine nanofiber materials are now described in connection with specific examples.

Example 1

Figure 2:
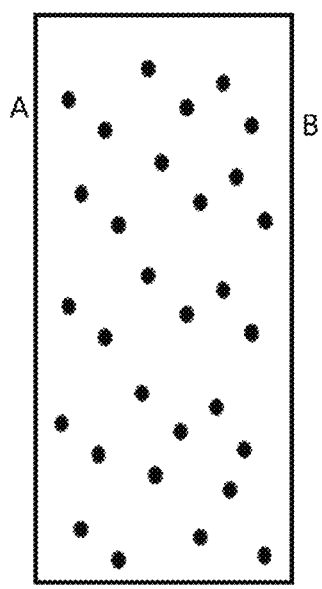
FIG. 2 is an unfolded view of the inner cylinder of the first blowing device of Example 1, A represents a connection end of the inner cylinder and the vertical plate I, and B represents a connection end of the inner cylinder and the vertical plate II.

An enhanced flash evaporation/electrospinning composite spinning equipment, as shown in FIG. 1, includes a flash spinning equipment, an electrospinning equipment, a receiving conveyor belt 9 of a earth wire 14, and a hot-pressing upper roller 10 and a hot-pressing lower roller 11 located on the upper and lower sides of the receiving conveyor belt 9;

the flash spinning equipment includes a flash spinning spinneret unit 5, a first blowing device 4, a polymer tank 1, a solvent tank 2 and a high-temperature and high-pressure reactor 3; the polymer tank 1, the solvent tank 2, and the flash spinning spinneret unit 5 are connected to the high-temperature and high-pressure reactor 3 at the same time;

the flash spinning spinneret unit 5 includes a first spinneret, and the first spinneret is connected to the earth wire 14;

the electrospinning equipment includes a high-voltage power supply 8, a second blowing device 12, an electrospinning spinneret unit 6, a solvent atomization generator 13 for atomizing a liquid solvent, and an electrospinning solution reservoir 7 connected to the electrospinning spinneret unit 6;

the electrospinning spinneret unit 6 includes a second spinneret, and the second spinneret is connected to the high-voltage power supply 8;

the first spinneret and the second spinneret are both located above the receiving conveyor belt 9 at opposite positions with a distance of D, and the value range of D is 15 cm; the distance between the first spinneret and the receiving conveyor belt 9 is 10 cm; the distance between the second spinneret and the receiving conveyor belt 9 is 10 cm;

the first blowing device 4 includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; as shown in FIG. 2 (the drawing is for illustrative purposes only and does not show all the spinneret holes completely), the inner cylinder randomly distributes 300 spinneret holes with a diameter of 0.4 mm;

in the first blowing device, an outer diameter of the inner cylinder is 0.5 m, an inner diameter of the outer cylinder is 0.3 m, a wall thickness of the inner cylinder is 0.1 m, and a wall thickness of the outer cylinder is 0.13 m; wherein the air supply device is used to provide an airflow with a pressure of 2 MPa;

the vertical plate I of the first blowing device 4 is sleeved on the first spinneret, so that a jet ejected from the spinneret enters the inner cylinder of the first blowing device 4;

the second blowing device 12 includes 4 partition plates, an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; the partition plates are parallel to the vertical plate I, and said plurality of partition plates divides the sealed cavity into 5 sub-sealed cavities of the same size; wherein the outer cylinder is provided with 5 intake holes, and intake holes is connected by intake pipes to the air supply device outside the outer cylinder; each sub-sealed cavity is connected to 1 intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator 13 (i.e., the intake pipe is connected to the air supply device and the solvent atomization generato at the same time); the inner cylinder randomly distributes 300 spinneret holes with a diameter of 0.4 mm;

in the second blowing device, an outer diameter of the inner cylinder is 0.5 m, an inner diameter of the outer cylinder is 0.3 m, a wall thickness of the inner cylinder is 0.1 m, and a wall thickness of the outer cylinder is 0.1 m; wherein the air supply device is used to provide an airflow with a pressure of 2 MPa;

the vertical plate I of the second blowing device 12 is sleeved on the second spinneret, so that a jet ejected from the spinneret enters the inner cylinder of the second blowing device 12;

the inner cylinder of the first blowing device 4 is coaxial with the inner cylinder of the second blowing device 12, the distance between the vertical plate II of the first blowing device 4 and the first spinneret is equal to the vertical plate II of the second blowing device 12 and the second spinneret, the distance between the vertical plate II of the first blowing device and the vertical plate II of the second blowing device is X, and X is 30% of D.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyethylene, an organosilicon hydrophobic agent (AkzoNobel SEAL80), and DMF; the concentration of the polyethylene in the electrospinning solution is 2 wt %; the concentration of the organosilicon hydrophobic agent (AkzoNobel SEAL80) in the electrospinning solution is 0.5 wt %;

the parameters of the electrospinning equipment are set so that the process parameters of the electrospinning include: a solution supply speed of 1 mL/min, a spinning voltage of 30 kV, an ambient temperature of 23° C., and an ambient relative humidity of 90%;

DMF is injected into the solvent atomization generator;

the parameters of the airflow controller are set so that the air volume of intake holes of each sub-sealed cavity along forward direction of the jet is respectively 10 m³/h, 18 m³/h, 32 m³/h, 36 m³/h, and 40 m³/h;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 2 wt % of polyethylene and a residual amount of dichloromethane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 8 MPa, a reaction temperature of 300° C., and a stirring speed of 500 rpm;

the parameters of the hot-pressing upper roller and the hot-pressing lower roller are set so that when hot-pressing is performed on the whole composed of nanofibers and microfibers, the temperature of hot-pressing is 100° C., and the time of hot-pressing is 0.2 min;

after the above preparations are completed, the equipment is started to prepare the flash spinning/electrospinning composite ultrafine nanofiber material.

The prepared flash spinning/electrospinning composite ultrafine nanofiber material has an overall membrane structure and is composed of nanofibers with an average diameter of 80 nm and microfibers with an average diameter of 1.2 μm; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 11:50; the flash spinning/electrospinning composite ultrafine nanofiber material has a strength of 450 N/50 mm, a porosity of 83%, a moisture permeability of 1600 g/m² in 24 hours, and a water pressure resistance of 45 kPa.

Example 2

An enhanced flash evaporation/electrospinning composite spinning equipment, includes a flash spinning equipment, an electrospinning equipment, a grounded receiving conveyor belt, and a hot-pressing upper roller and a hot-pressing lower roller located on the upper and lower sides of the receiving conveyor belt;

the flash spinning equipment includes a flash spinning spinneret unit, a first blowing device, a polymer tank, a solvent tank and a high-temperature and high-pressure reactor; the polymer tank, the solvent tank, and the flash spinning spinneret unit are connected to the high-temperature and high-pressure reactor at the same time;
the flash spinning spinneret unit includes a first spinneret, and the first spinneret is connected to the earth wire;
the electrospinning equipment includes a high-voltage power supply, a second blowing device, an electrospinning spinneret unit, a solvent atomization generator for atomizing a liquid solvent, and an electrospinning solution reservoir connected to the electrospinning spinneret unit;
the electrospinning spinneret unit includes a second spinneret, and the second spinneret is connected to the high-voltage power supply;
the first spinneret and the second spinneret are both located above the receiving conveyor belt at opposite positions with a distance of D, and the value range of D is 18 cm; the distance between the first spinneret and the receiving conveyor belt is 20 cm; the distance between the second spinneret and the receiving conveyor belt is 20 cm;
the first blowing device includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; the inner cylinder randomly distributes 350 spinneret holes with a diameter of 0.5 mm;
in the first blowing device, an outer diameter of the inner cylinder is 1 m, an inner diameter of the outer cylinder is 0.7 m, a wall thickness of the inner cylinder is 0.15 m, and a wall thickness of the outer cylinder is 0.18 m; wherein the air supply device is used to provide an airflow with a pressure of 5 MPa;
the vertical plate I of the first blowing device is sleeved on the first spinneret, so that a jet ejected from the spinneret enters the inner cylinder of the first blowing device;
the second blowing device includes 4 partition plates, an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; the partition plates are parallel to the vertical plate I, and said plurality of partition plates divides the sealed cavity into 5 sub-sealed cavities of the same size; wherein the outer cylinder is provided with 5 intake holes, and intake holes is connected by intake pipes to the air supply device outside the outer cylinder; each sub-sealed cavity is connected to 1 intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator (i.e., the intake pipe is connected to the air supply device and the solvent atomization generato at the same time); the inner cylinder randomly distributes 380 spinneret holes with a diameter of 0.52 mm;
in the second blowing device, an outer diameter of the inner cylinder is 1 m, an inner diameter of the outer cylinder is 0.8 m, a wall thickness of the inner cylinder is 0.12 m, and a wall thickness of the outer cylinder is 0.12 m; wherein the air supply device is used to provide an airflow with a pressure of 7.8 MPa;
the vertical plate I of the second blowing device is sleeved on the second spinneret, so that a jet ejected from the spinneret enters the inner cylinder of the second blowing device;
the inner cylinder of the first blowing device is coaxial with the inner cylinder of the second blowing device, the distance between the vertical plate II of the first blowing device and the first spinneret is equal to the vertical plate II of the second blowing device and the second spinneret, the distance between the vertical plate II of the first blowing device and the vertical plate II of the second blowing device is X, and X is 38% of D.

A preparation method of a flash spinning/electrospinning composite ultrafine nanofiber material, uses the said enhanced flash evaporation/electrospinning composite spinning equipment, wherein the following preparations are carried out before starting the equipment:
the electrospinning solution is injected into the electrospinning solution reservoir, and the electrospinning solution includes polyvinylidene fluoride, carbon hexahydrophobic agent (KOSHI Z-2001), and DMAc; the concentration of polyvinylidene fluoride in the electrospinning solution is 4 wt %; the concentration of carbon hexahydrophobic agent (KOSHI Z-2001) in the electrospinning solution is 1 wt %;
the parameters of the electrospinning equipment are set so that the process parameters of the electrospinning include: a solution supply speed of 2 mL/min, a spinning voltage of 40 kV, an ambient temperature of 23° C., and an ambient relative humidity of 80%;
DMAc is injected into the solvent atomization generator;
the parameters of the airflow controller are set so that the air volume of intake holes of each sub-sealed cavity along forward direction of the jet is respectively 12 $m^3/h$, 20 $m^3/h$, 34 $m^3/h$, 38 $m^3/h$, and 44 $m^3/h$;
a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 6 wt % of polyethylene and a residual amount of 1H,6H-perfluorohexane; the polyethylene in the flash spinning solution has a melt index of 0.7 g/10 min at a temperature of 160° C. and a loading of 5 kg, and has a melting point of 133° C.;
the parameters of the flash spinning equipment are set so that the process parameters of the flash spinning include: a reaction pressure of 13 MPa, a reaction temperature of 270° C., and a stirring speed of 700 rpm;
the parameters of the hot-pressing upper roller and the hot-pressing lower roller are set so that when hot-pressing is performed on the whole composed of nanofibers and microfibers, the temperature of hot-pressing is 130° C., and the time of hot-pressing is 0.3 min;

after the above preparations are completed, the equipment is started to prepare the flash spinning/electrospinning composite ultrafine nanofiber material.

The prepared flash spinning/electrospinning composite ultrafine nanofiber material has an overall membrane structure and is composed of nanofibers with an average diameter of 150 nm and microfibers with an average diameter of 3 µm; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 1:4; the flash spinning/electrospinning composite ultrafine nanofiber material has a strength of 480 N/50 mm, a porosity of 85%, a moisture permeability of 1980 g/m$^2$ in 24 hours, and a water pressure resistance of 40 kPa.

Example 3

An enhanced flash evaporation/electrospinning composite spinning equipment, includes a flash spinning equipment, an electrospinning equipment, a grounded receiving conveyor belt, and a hot-pressing upper roller and a hot-pressing lower roller located on the upper and lower sides of the receiving conveyor belt;

the flash spinning equipment includes a flash spinning spinneret unit, a first blowing device, a polymer tank, a solvent tank and a high-temperature and high-pressure reactor; the polymer tank, the solvent tank, and the flash spinning spinneret unit are connected to the high-temperature and high-pressure reactor at the same time;

the flash spinning spinneret unit includes a first spinneret, and the first spinneret is connected to the earth wire;

the electrospinning equipment includes a high-voltage power supply, a second blowing device, an electrospinning spinneret unit, a solvent atomization generator for atomizing a liquid solvent, and an electrospinning solution reservoir connected to the electrospinning spinneret unit;

the electrospinning spinneret unit includes a second spinneret, and the second spinneret is connected to the high-voltage power supply;

the first spinneret and the second spinneret are both located above the receiving conveyor belt at opposite positions with a distance of D, and the value range of D is 22 cm; the distance between the first spinneret and the receiving conveyor belt is 30 cm; the distance between the second spinneret and the receiving conveyor belt is 30 cm;

the first blowing device includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; the inner cylinder randomly distributes 400 spinneret holes with a diameter of 0.6 mm;

in the first blowing device, an outer diameter of the inner cylinder is 1.5 m, an inner diameter of the outer cylinder is 1.2 m, a wall thickness of the inner cylinder is 0.2 m, and a wall thickness of the outer cylinder is 0.2 m; wherein the air supply device is used to provide an airflow with a pressure of 10 MPa;

the vertical plate I of the first blowing device is sleeved on the first spinneret, so that a jet ejected from the spinneret enters the inner cylinder of the first blowing device;

the second blowing device includes 5 partition plates, an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; the partition plates are parallel to the vertical plate I, and said plurality of partition plates divides the sealed cavity into 6 sub-sealed cavities of the same size; wherein the outer cylinder is provided with 6 intake holes, and intake holes is connected by intake pipes to the air supply device outside the outer cylinder; each sub-sealed cavity is connected to 1 intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator (i.e., the intake pipe is connected to the air supply device and the solvent atomization generato at the same time); the inner cylinder randomly distributes 410 spinneret holes with a diameter of 0.63 mm;

in the second blowing device, an outer diameter of the inner cylinder is 1.5 m, an inner diameter of the outer cylinder is 1.4 m, a wall thickness of the inner cylinder is 0.18 m, and a wall thickness of the outer cylinder is 0.18 m; wherein the air supply device is used to provide an airflow with a pressure of 12.9 MPa;

the vertical plate I of the second blowing device is sleeved on the second spinneret, so that a jet ejected from the spinneret enters the inner cylinder of the second blowing device;

the inner cylinder of the first blowing device is coaxial with the inner cylinder of the second blowing device, the distance between the vertical plate II of the first blowing device and the first spinneret is equal to the vertical plate II of the second blowing device and the second spinneret, the distance between the vertical plate II of the first blowing device and the vertical plate II of the second blowing device is X, and X is 46% of D.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyacrylonitrile, a carbon eight hydrophobic agent (Daikin 5003F), and methylene chloride; the concentration of the polyacrylonitrile in the electrospinning solution is 10 wt %; the concentration of the carbon eight hydrophobic agent (Daikin 5003F) in the electrospinning solution is 3 wt %;

the parameters of the electrospinning equipment are set so that the process parameters of the electrospinning include: a solution supply speed of 4 mL/min, a spinning voltage of 50 kV, an ambient temperature of 24° C., and an ambient relative humidity of 70%;

methylene chloride is injected into the solvent atomization generator;

the parameters of the airflow controller are set so that the air volume of intake holes of each sub-sealed cavity along forward direction of the jet is respectively 10 m$^3$/h, 18 m$^3$/h, 32 m$^3$/h, 36 m$^3$/h, 40 m$^3$/h and 46 m$^3$/h;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 10 wt % of polyethylene and a residual amount of n-pentane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 16 MPa, a reaction temperature of 230° C., and a stirring speed of 900 rpm;

the parameters of the hot-pressing upper roller and the hot-pressing lower roller are set so that when hot-pressing is performed on the whole composed of nanofibers and microfibers, the temperature of hot-pressing is 180° C., and the time of hot-pressing is 0.4 min;

after the above preparations are completed, the equipment is started to prepare the flash spinning/electrospinning composite ultrafine nanofiber material.

The prepared flash spinning/electrospinning composite ultrafine nanofiber material has an overall membrane structure and is composed of nanofibers with an average diameter of 230 nm and microfibers with an average diameter of 6 μm; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 3:10; the flash spinning/electrospinning composite ultrafine nanofiber material has a strength of 500 N/50 mm, a porosity of 88%, a moisture permeability of 2500 g/m$^2$ in 24 hours, and a water pressure resistance of 36 kPa.

Example 4

An enhanced flash evaporation/electrospinning composite spinning equipment, includes a flash spinning equipment, an electrospinning equipment, a grounded receiving conveyor belt, and a hot-pressing upper roller and a hot-pressing lower roller located on the upper and lower sides of the receiving conveyor belt;

the flash spinning equipment includes a flash spinning spinneret unit, a first blowing device, a polymer tank, a solvent tank and a high-temperature and high-pressure reactor; the polymer tank, the solvent tank, and the flash spinning spinneret unit are connected to the high-temperature and high-pressure reactor at the same time;

the flash spinning spinneret unit includes a first spinneret, and the first spinneret is connected to the earth wire;

the electrospinning equipment includes a high-voltage power supply, a second blowing device, an electrospinning spinneret unit, a solvent atomization generator for atomizing a liquid solvent, and an electrospinning solution reservoir connected to the electrospinning spinneret unit;

the electrospinning spinneret unit includes a second spinneret, and the second spinneret is connected to the high-voltage power supply;

the first spinneret and the second spinneret are both located above the receiving conveyor belt at opposite positions with a distance of D, and the value range of D is 26 cm; the distance between the first spinneret and the receiving conveyor belt is 40 cm; the distance between the second spinneret and the receiving conveyor belt is 40 cm;

the first blowing device includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; the inner cylinder randomly distributes 450 spinneret holes with a diameter of 0.7 mm;

in the first blowing device, an outer diameter of the inner cylinder is 2 m, an inner diameter of the outer cylinder is 1.6 m, a wall thickness of the inner cylinder is 0.22 m, and a wall thickness of the outer cylinder is 0.23 m; wherein the air supply device is used to provide an airflow with a pressure of 15 MPa;

the vertical plate I of the first blowing device is sleeved on the first spinneret, so that a jet ejected from the spinneret enters the inner cylinder of the first blowing device;

the second blowing device includes 6 partition plates, an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; the partition plates are parallel to the vertical plate I, and said plurality of partition plates divides the sealed cavity into 7 sub-sealed cavities of the same size; wherein the outer cylinder is provided with 7 intake holes, and intake holes is connected by intake pipes to the air supply device outside the outer cylinder; each sub-sealed cavity is connected to 1 intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator (i.e., the intake pipe is connected to the air supply device and the solvent atomization generato at the same time); the inner cylinder randomly distributes 440 spinneret holes with a diameter of 0.75 mm;

in the second blowing device, an outer diameter of the inner cylinder is 2 m, an inner diameter of the outer cylinder is 1.9 m, a wall thickness of the inner cylinder is 0.2 m, and a wall thickness of the outer cylinder is 0.2 m; wherein the air supply device is used to provide an airflow with a pressure of 19 MPa;

the vertical plate I of the second blowing device is sleeved on the second spinneret, so that a jet ejected from the spinneret enters the inner cylinder of the second blowing device;

the inner cylinder of the first blowing device is coaxial with the inner cylinder of the second blowing device, the distance between the vertical plate II of the first blowing device and the first spinneret is equal to the vertical plate II of the second blowing device and the second spinneret, the distance between the vertical plate II of the first blowing device and the vertical plate II of the second blowing device is X, and X is 51% of D.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyurethane, a carbon eight hydrophobic agent (Daikin 5003F), and 1H,6H-perfluorohexane; the concentration of polyurethane in the electrospinning solution is 20 wt %; the concentration of carbon eight hydrophobic agent (Daikin 5003F) in the electrospinning solution is 5 wt %;

the parameters of the electrospinning equipment are set so that the process parameters of the electrospinning include: a solution supply speed of 6 mL/min, a spinning voltage of 70 kV, an ambient temperature of 24° C., and an ambient relative humidity of 50%;

1H,6H-perfluorohexane is injected into the solvent atomization generator;

the parameters of the airflow controller are set so that the air volume of intake holes of each sub-sealed cavity along forward direction of the jet is respectively 14 $m^3/h$, 17 $m^3/h$, 28 $m^3/h$, 33 $m^3/h$, 38 $m^3/h$, 43 $m^3/h$, and 50 $m^3/h$;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 15 wt % of polyethylene and a residual amount of cyclopentane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 19 MPa, a reaction temperature of 200° C., and a stirring speed of 1100 rpm;

the parameters of the hot-pressing upper roller and the hot-pressing lower roller are set so that when hot-pressing is performed on the whole composed of nanofibers and microfibers, the temperature of hot-pressing is 90° C., and the time of hot-pressing is 0.5 min;

after the above preparations are completed, the equipment is started to prepare the flash spinning/electrospinning composite ultrafine nanofiber material.

The prepared flash spinning/electrospinning composite ultrafine nanofiber material has an overall membrane structure and is composed of nanofibers with an average diameter of 300 nm and microfibers with an average diameter of 12 μm; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 33:100; the flash spinning/electrospinning composite ultrafine nanofiber material has a strength of 510 N/50 mm, a porosity of 91%, a moisture permeability of 3600 $g/m^2$ in 24 hours, and a water pressure resistance of 34 kPa.

Example 5

An enhanced flash evaporation/electrospinning composite spinning equipment, includes a flash spinning equipment, an electrospinning equipment, a grounded receiving conveyor belt, and a hot-pressing upper roller and a hot-pressing lower roller located on the upper and lower sides of the receiving conveyor belt;

the flash spinning equipment includes a flash spinning spinneret unit, a first blowing device, a polymer tank, a solvent tank and a high-temperature and high-pressure reactor; the polymer tank, the solvent tank, and the flash spinning spinneret unit are connected to the high-temperature and high-pressure reactor at the same time;

the flash spinning spinneret unit includes a first spinneret, and the first spinneret is connected to the earth wire;

the electrospinning equipment includes a high-voltage power supply, a second blowing device, an electrospinning spinneret unit, a solvent atomization generator for atomizing a liquid solvent, and an electrospinning solution reservoir connected to the electrospinning spinneret unit;

the electrospinning spinneret unit includes a second spinneret, and the second spinneret is connected to the high-voltage power supply;

the first spinneret and the second spinneret are both located above the receiving conveyor belt at opposite positions with a distance of D, and the value range of D is 32 cm; the distance between the first spinneret and the receiving conveyor belt is 50 cm; the distance between the second spinneret and the receiving conveyor belt is 50 cm;

the first blowing device includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; the inner cylinder randomly distributes 470 spinneret holes with a diameter of 0.9 mm;

in the first blowing device, an outer diameter of the inner cylinder is 2.5 m, an inner diameter of the outer cylinder is 2.3 m, a wall thickness of the inner cylinder is 0.25 m, and a wall thickness of the outer cylinder is 0.27 m; wherein the air supply device is used to provide an airflow with a pressure of 20 MPa;

the vertical plate I of the first blowing device is sleeved on the first spinneret, so that a jet ejected from the spinneret enters the inner cylinder of the first blowing device;

the second blowing device includes 7 partition plates, an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; the partition plates are parallel to the vertical plate I, and said plurality of partition plates divides the sealed cavity into 8 sub-sealed cavities of the same size; wherein the outer cylinder is provided with 8 intake holes, and intake holes is connected by intake pipes to the air supply device outside the outer cylinder; each sub-sealed cavity is connected to 1 intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator (i.e., the intake pipe is connected to the air supply device and the solvent atomization generato at the same time); the inner cylinder randomly distributes 460 spinneret holes with a diameter of 0.88 mm;

in the second blowing device, an outer diameter of the inner cylinder is 2.5 m, an inner diameter of the outer cylinder is 2.3 m, a wall thickness of the inner cylinder is 0.23 m, and a wall thickness of the outer cylinder is 0.23 m; wherein the air supply device is used to provide an airflow with a pressure of 25.9 MPa;

the vertical plate I of the second blowing device is sleeved on the second spinneret, so that a jet ejected from the spinneret enters the inner cylinder of the second blowing device;

the inner cylinder of the first blowing device is coaxial with the inner cylinder of the second blowing device, the distance between the vertical plate II of the first blowing device and the first spinneret is equal to the vertical plate II of the second blowing device and the second spinneret, the distance between the vertical plate II of the first blowing device and the vertical plate II of the second blowing device is X, and X is 54% of D.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyvinyl butyral and n-pentane; the concentration of polyvinyl butyral in the electrospinning solution is 30 wt %;

the parameters of the electrospinning equipment are set so that the process parameters of the electrospinning include: a solution supply speed of 8 mL/min, a spinning voltage of 80 kV, an ambient temperature of 25° C., and an ambient relative humidity of 35%;

n-pentane is injected into the solvent atomization generator;

the parameters of the airflow controller are set so that the air volume of intake holes of each sub-sealed cavity along forward direction of the jet is respectively 6 $m^3$/h, 12 $m^3$/h, 18 $m^3$/h, 27 $m^3$/h, 34 $m^3$/h, 36 $m^3$/h, 39 $m^3$/h, and 45 $m^3$/h;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 27 wt % of polyethylene and a residual amount of methylene chloride; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 25 MPa, a reaction temperature of 180° C., and a stirring speed of 1300 rpm;

the parameters of the hot-pressing upper roller and the hot-pressing lower roller are set so that when hot-pressing is performed on the whole composed of nanofibers and microfibers, the temperature of hot-pressing is 110° C., and the time of hot-pressing is 0.6 min;

after the above preparations are completed, the equipment is started to prepare the flash spinning/electrospinning composite ultrafine nanofiber material.

The prepared flash spinning/electrospinning composite ultrafine nanofiber material has an overall membrane structure and is composed of nanofibers with an average diameter of 580 nm and microfibers with an average diameter of 16 μm; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 7:20; the flash spinning/electrospinning composite ultrafine nanofiber material has a strength of 550 N/50 mm, a porosity of 91%, a moisture permeability of 4200 g/$m^2$ in 24 hours, and a water pressure resistance of 26 kPa.

Example 6

An enhanced flash evaporation/electrospinning composite spinning equipment, includes a flash spinning equipment, an electrospinning equipment, a grounded receiving conveyor belt, and a hot-pressing upper roller and a hot-pressing lower roller located on the upper and lower sides of the receiving conveyor belt;

the flash spinning equipment includes a flash spinning spinneret unit, a first blowing device, a polymer tank, a solvent tank and a high-temperature and high-pressure reactor; the polymer tank, the solvent tank, and the flash spinning spinneret unit are connected to the high-temperature and high-pressure reactor at the same time;

the flash spinning spinneret unit includes a first spinneret, and the first spinneret is connected to the earth wire;

the electrospinning equipment includes a high-voltage power supply, a second blowing device, an electrospinning spinneret unit, a solvent atomization generator for atomizing a liquid solvent, and an electrospinning solution reservoir connected to the electrospinning spinneret unit;

the electrospinning spinneret unit includes a second spinneret, and the second spinneret is connected to the high-voltage power supply;

the first spinneret and the second spinneret are both located above the receiving conveyor belt at opposite positions with a distance of D, and the value range of D is 40 cm; the distance between the first spinneret and the receiving conveyor belt is 60 cm; the distance between the second spinneret and the receiving conveyor belt is 60 cm;

the first blowing device includes an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; wherein the outer cylinder is provided with intake holes, and intake holes is connected by intake pipes to the air supply device outside the outer cylinder; the inner cylinder randomly distributes 500 spinneret holes with a diameter of 1 mm;

in the first blowing device, an outer diameter of the inner cylinder is 3 m, an inner diameter of the outer cylinder is 2.7 m, a wall thickness of the inner cylinder is 0.3 m, and a wall thickness of the outer cylinder is 0.3 m; wherein the air supply device is used to provide an airflow with a pressure of 30 MPa;

the vertical plate I of the first blowing device is sleeved on the first spinneret, so that a jet ejected from the spinneret enters the inner cylinder of the first blowing device;

the second blowing device includes 8 partition plates, an air supply device, an inner cylinder, an outer cylinder, a vertical plate I and a vertical plate II; wherein the outer cylinder is sleeved on the inner cylinder, the outer cylinder and the inner cylinder are coaxial and flush at both ends, and one end is sealed by the vertical plate I at the same time, while the other end is connected by the vertical plate II; wherein the inner cylinder, the outer cylinder, the vertical plate I and the vertical plate II together form a sealed cavity; the partition plates are parallel to the vertical plate I, and said plurality of partition plates divides the sealed cavity into 9 sub-sealed cavities of the same size; wherein the outer cylinder is provided with 9 intake holes, and intake holes is connected by intake pipes to the air supply device outside the outer cylinder; each sub-sealed cavity is connected to 1 intake hole, and the intake hole is equipped with an air volume controller, the air volume of intake holes of each sub-sealed cavity gradually increases along forward direction of the jet, and the intake pipes connected to intake holes of each sub-sealed cavity are simultaneously connected to the solvent atomization generator (i.e., the intake pipe is connected to the air supply device and the solvent atomization generato at the same time); the inner cylinder randomly distributes 500 spinneret holes with a diameter of 1 mm;

in the second blowing device, an outer diameter of the inner cylinder is 3 m, an inner diameter of the outer cylinder is 2.7 m, a wall thickness of the inner cylinder is 0.3 m, and a wall thickness of the outer cylinder is 0.3 m; wherein the air supply device is used to provide an airflow with a pressure of 30 MPa;

the vertical plate I of the second blowing device is sleeved on the second spinneret, so that a jet ejected from the spinneret enters the inner cylinder of the second blowing device;

the inner cylinder of the first blowing device is coaxial with the inner cylinder of the second blowing device, the distance between the vertical plate II of the first blowing device and the first spinneret is equal to the vertical plate II of the second blowing device and the second spinneret, the distance between the vertical plate II of the first blowing device and the vertical plate II of the second blowing device is X, and X is 59% of D.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyvinyl butyral and cyclopentane; the concentration of polyvinyl butyral in the electrospinning solution is 40 wt %;

the parameters of the electrospinning equipment are set so that the process parameters of the electrospinning include: a solution supply speed of 10 mL/min, a spinning voltage of 100 kV, an ambient temperature of 25° C., and an ambient relative humidity of 20%;

cyclopentane is injected into the solvent atomization generator;

the parameters of the airflow controller are set so that the air volume of intake holes of each sub-sealed cavity along forward direction of the jet is respectively 3 m$^3$/h, 7 m$^3$/h, 10 m$^3$/h, 15 m$^3$/h, 18 m$^3$/h, 21 m$^3$/h, 26 m$^3$/h, 31 m$^3$/h, and 36 m$^3$/h;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 35 wt % of polyethylene and a residual amount of 1H,6H-perfluorohexane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 30 MPa, a reaction temperature of 150° C., and a stirring speed of 1500 rpm;

the parameters of the hot-pressing upper roller and the hot-pressing lower roller are set so that when hot-pressing is performed on the whole composed of nanofibers and microfibers, the temperature of hot-pressing is 110° C., and the time of hot-pressing is 0.7 min;

after the above preparations are completed, the equipment is started to prepare the flash spinning/electrospinning composite ultrafine nanofiber material.

The prepared flash spinning/electrospinning composite ultrafine nanofiber material has an overall membrane structure and is composed of nanofibers with an average diameter of 760 nm and microfibers with an average diameter of 20 µm; the microfibers are entangled, curled and interpenetrated with each other, the nanofibers are evenly interspersed in the microfibers, and some of the nanofibers form entangled and interpenetrated structures with the microfibers; mutually bonding is formed between the nanofibers, between the microfibers, and between the nanofibers and the microfibers; the mass ratio of the nanofibers to the microfibers is 2:5; the flash spinning/electrospinning composite ultrafine nanofiber material has a strength of 580 N/50 mm, a porosity of 93%, a moisture permeability of 5900 g/m² in 24 hours, and a water pressure resistance of 18 kPa.

Example 7

An enhanced flash evaporation/electrospinning composite spinning equipment, basically the same as Example 1, except for that: Example 7 does not have a first blowing device, a second blowing device, a solvent atomization generator, and an airflow controller.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyethylene, an organosilicon hydrophobic agent (AkzoNobel SEAL80), and DMF; the concentration of the polyethylene in the electrospinning solution is 2 wt %; the concentration of the organosilicon hydrophobic agent (AkzoNobel SEAL80) in the electrospinning solution is 0.5 wt %;

the parameters of the electrospinning equipment are set so that the process parameters of the electrospinning include: a solution supply speed of 1 mL/min, a spinning voltage of 30 kV, an ambient temperature of 23° C., and an ambient relative humidity of 90%;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 2 wt % of polyethylene and a residual amount of dichloromethane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 8 MPa, a reaction temperature of 300° C., and a stirring speed of 500 rpm;

the parameters of the hot-pressing upper roller and the hot-pressing lower roller are set so that when hot-pressing is performed on the whole composed of nanofibers and microfibers, the temperature of hot-pressing is 100° C., and the time of hot-pressing is 0.2 min;

after the above preparations are completed, the equipment is started to prepare the flash spinning/electrospinning composite ultrafine nanofiber material.

The prepared flash spinning/electrospinning composite ultrafine nanofiber material has a strength of 320 N/50 mm, a porosity of 68%, a moisture permeability of 830 g/m² in 24 hours, and a water pressure resistance of 9 kPa.

Example 8

An enhanced flash evaporation/electrospinning composite spinning equipment, basically the same as Example 2, except for that: Example 8 does not have a first blowing device, a second blowing device, a solvent atomization generator, and an airflow controller.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyvinylidene fluoride, carbon hexahydrophobic agent (KOSHI Z-2001), and DMAc; the concentration of polyvinylidene fluoride in the electrospinning solution is 4 wt %; the concentration of carbon hexahydrophobic agent (KOSHI Z-2001) in the electrospinning solution is 1 wt %;

the parameters of the electrospinning equipment are set so that the process parameters of the electrospinning include: a solution supply speed of 2 mL/min, a spinning voltage of 40 kV, an ambient temperature of 23° C., and an ambient relative humidity of 80%;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 6 wt % of polyethylene and a residual amount of 1H,6H-perfluorohexane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 13 MPa, a reaction temperature of 270° C., and a stirring speed of 700 rpm;

the parameters of the hot-pressing upper roller and the hot-pressing lower roller are set so that when hot-pressing is performed on the whole composed of nanofibers and microfibers, the temperature of hot-pressing is 130° C., and the time of hot-pressing is 0.3 min;

after the above preparations are completed, the equipment is started to prepare the flash spinning/electrospinning composite ultrafine nanofiber material.

The prepared flash spinning/electrospinning composite ultrafine nanofiber material has a strength of 278 N/50 mm, a porosity of 62%, a moisture permeability of 990 g/m² in 24 hours, and a water pressure resistance of 10.6 kPa.

Example 9

An enhanced flash evaporation/electrospinning composite spinning equipment, basically the same as Example 1, except for that: Example 9 does not have a solvent atomization generator and an airflow controller, and does not have partition plates in the second blowing device.

A preparation method of a flash spinning/electrospinning composite ultrafine nanofiber material, uses the said enhanced flash evaporation/electrospinning composite spinning equipment, wherein the following preparations are carried out before starting the equipment:
the electrospinning solution is injected into the electrospinning solution reservoir, and the electrospinning solution includes polyethylene, an organosilicon hydrophobic agent (AkzoNobel SEAL80), and DMF; the concentration of the polyethylene in the electrospinning solution is 2 wt %; the concentration of the organosilicon hydrophobic agent (AkzoNobel SEAL80) in the electrospinning solution is 0.5 wt %;
the parameters of the electrospinning equipment are set so that the process parameters of the electrospinning include: a solution supply speed of 1 mL/min, a spinning voltage of 30 kV, an ambient temperature of 23° C., and an ambient relative humidity of 90%;
a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 2 wt % of polyethylene and a residual amount of dichloromethane; the polyethylene in the flash spinning solution has a melt index of 0.7 g/10 min at a temperature of 160° C. and a loading of 5 kg, and has a melting point of 133° C.;
the parameters of the flash spinning equipment are set so that the process parameters of the flash spinning include: a reaction pressure of 8 MPa, a reaction temperature of 300° C., and a stirring speed of 500 rpm;
the parameters of the hot-pressing upper roller and the hot-pressing lower roller are set so that when hot-pressing is performed on the whole composed of nanofibers and microfibers, the temperature of hot-pressing is 100° C., and the time of hot-pressing is 0.2 min;
after the above preparations are completed, the equipment is started to prepare the flash spinning/electrospinning composite ultrafine nanofiber material.

The prepared flash spinning/electrospinning composite ultrafine nanofiber material has a strength of 260 N/50 mm, a porosity of 58%, a moisture permeability of 880 g/m² in 24 hours, and a water pressure resistance of 8.1 kPa.

Example 10

An enhanced flash evaporation/electrospinning composite spinning equipment, basically the same as Example 2, except for that: Example 10 does not have a solvent atomization generator and an airflow controller, and does not have partition plates in the second blowing device.

A preparation method of a flash spinning/electrospinning composite ultrafine nanofiber material, uses the said enhanced flash evaporation/electrospinning composite spinning equipment, wherein the following preparations are carried out before starting the equipment:
the electrospinning solution is injected into the electrospinning solution reservoir, and the electrospinning solution includes polyvinylidene fluoride, carbon hexahydrophobic agent (KOSHI Z-2001), and DMAc; the concentration of polyvinylidene fluoride in the electrospinning solution is 4 wt %; the concentration of carbon hexahydrophobic agent (KOSHI Z-2001) in the electrospinning solution is 1 wt %;
the parameters of the electrospinning equipment are set so that the process parameters of the electrospinning include: a solution supply speed of 2 mL/min, a spinning voltage of 40 kV, an ambient temperature of 23° C., and an ambient relative humidity of 80%;
a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 6 wt % of polyethylene and a residual amount of 1H,6H-perfluorohexane; the polyethylene in the flash spinning solution has a melt index of 0.7 g/10 min at a temperature of 160° C. and a loading of 5 kg, and has a melting point of 133° C.;
the parameters of the flash spinning equipment are set so that the process parameters of the flash spinning include: a reaction pressure of 13 MPa, a reaction temperature of 270° C., and a stirring speed of 700 rpm;
the parameters of the hot-pressing upper roller and the hot-pressing lower roller are set so that when hot-pressing is performed on the whole composed of nanofibers and microfibers, the temperature of hot-pressing is 130° C., and the time of hot-pressing is 0.3 min;
after the above preparations are completed, the equipment is started to prepare the flash spinning/electrospinning composite ultrafine nanofiber material.

The prepared flash spinning/electrospinning composite ultrafine nanofiber material has a strength of 340 N/50 mm, a porosity of 69%, a moisture permeability of 1180 g/m² in 24 hours, and a water pressure resistance of 12 kPa.

Example 11

An enhanced flash evaporation/electrospinning composite spinning equipment, basically the same as Example 1, except for that: Example 11 does not have a hot-pressing upper roller and a hot-pressing lower roller located on the upper and lower sides of the receiving conveyor belt.

A preparation method of a flash spinning/electrospinning composite ultrafine nanofiber material, uses the said enhanced flash evaporation/electrospinning composite spinning equipment, wherein the following preparations are carried out before starting the equipment:
the electrospinning solution is injected into the electrospinning solution reservoir, and the electrospinning solution includes polyethylene, an organosilicon hydrophobic agent (AkzoNobel SEAL80), and DMF; the concentration of the polyethylene in the electrospinning solution is 2 wt %; the concentration of the organosilicon hydrophobic agent (AkzoNobel SEAL80) in the electrospinning solution is 0.5 wt %;
the parameters of the electrospinning equipment are set so that the process parameters of the electrospinning include: a solution supply speed of 1 mL/min, a spinning voltage of 30 kV, an ambient temperature of 23° C., and an ambient relative humidity of 90%;
DMF is injected into the solvent atomization generator; the parameters of the airflow controller are set so that the air volume of intake holes of each sub-sealed cavity along forward direction of the jet is respectively 10 m³/h, 18 m³/h, 32 m³/h, 36 m³/h, and 40 m³/h;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 2 wt % of polyethylene and a residual amount of dichloromethane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 8 MPa, a reaction temperature of 300° C., and a stirring speed of 500 rpm;

after the above preparations are completed, the equipment is started to prepare the flash spinning/electrospinning composite ultrafine nanofiber material.

The prepared flash spinning/electrospinning composite ultrafine nanofiber material has a strength of 110 N/50 mm, a porosity of 75%, a moisture permeability of 1300 g/m² in 24 hours, and a water pressure resistance of 6 kPa.

Example 12

An enhanced flash evaporation/electrospinning composite spinning equipment, basically the same as Example 2, except for that: Example 12 does not have a hot-pressing upper roller and a hot-pressing lower roller located on the upper and lower sides of the receiving conveyor belt.

A preparation method of a flash spinning/electrospinning composite ultrafine nanofiber material, uses the said enhanced flash evaporation/electrospinning composite spinning equipment, wherein the following preparations are carried out before starting the equipment:

the electrospinning solution is injected into the electrospinning solution reservoir, and the electrospinning solution includes polyvinylidene fluoride, carbon hexahydrophobic agent (KOSHI Z-2001), and DMAc; the concentration of polyvinylidene fluoride in the electrospinning solution is 4 wt %; the concentration of carbon hexahydrophobic agent (KOSHI Z-2001) in the electrospinning solution is 1 wt %;

the parameters of the electrospinning equipment are set so that the process parameters of the electrospinning include: a solution supply speed of 2 mL/min, a spinning voltage of 40 kV, an ambient temperature of 23° C., and an ambient relative humidity of 80%;

DMAc is injected into the solvent atomization generator;

the parameters of the airflow controller are set so that the air volume of intake holes of each sub-sealed cavity along forward direction of the jet is respectively 12 m³/h, 20 m³/h, 34 m³/h, 38 m³/h, and 44 m³/h;

a certain amount of polymer is put into the polymer tank, and a certain amount of solvent is put into the solvent tank, the type and addition amount of polymer and the type and addition amount of solvent need to meet the following requirements: after the startup of the equipment, the flash spinning solution is formed in the high-temperature and high-pressure reactor, consisting of 6 wt % of polyethylene and a residual amount of 1H,6H-perfluorohexane; the polyethylene in the flash spinning solution has a melt index of 0.7 g/10 min at a temperature of 160° C. and a loading of 5 kg, and has a melting point of 133° C.;

the parameters of the flash spinning equipment are set so that the process parameters of the flash spinning include: a reaction pressure of 13 MPa, a reaction temperature of 270° C., and a stirring speed of 700 rpm;

after the above preparations are completed, the equipment is started to prepare the flash spinning/electrospinning composite ultrafine nanofiber material.

The prepared flash spinning/electrospinning composite ultrafine nanofiber material has a strength of 105 N/50 mm, a porosity of 72%, a moisture permeability of 1280 g/m² in 24 hours, and a water pressure resistance of 5.5 kPa.

What is claimed is:

1. A flash evaporation/electrospinning composite spinning equipment, comprising a flash spinning equipment,
an electrospinning equipment, and
a grounded receiving conveyor belt;
wherein the flash spinning equipment comprises a flash spinning spinneret unit, the flash spinning spinneret unit comprises a first spinneret, and the first spinneret is grounded; the electrospinning equipment comprises a high-voltage power supply and an electrospinning spinneret unit, the electrospinning spinneret unit comprises a second spinneret, and the second spinneret is connected to the high-voltage power supply;
wherein the first spinneret and the second spinneret are both located above the receiving conveyor belt at opposite positions with a distance of D, and a value range of D is 15-40 cm;
wherein the flash spinning equipment further comprises a first blowing device; the electrospinning equipment further comprises a second blowing device;
wherein the first blowing device or the second blowing device comprises an air supply device, an inner cylinder, an outer cylinder, a first vertical plate, and a second vertical plate; wherein the outer cylinder is sleeved on the inner cylinder, the outer cylinder and the inner cylinder are coaxial and flush at both ends, and one end of the outer cylinder and the inner cylinder is sealed by the first vertical plate simultaneously, while the other end of the outer cylinder and the inner cylinder is connected by the second vertical plate; the inner cylinder, the outer cylinder, the first vertical plate, and the second vertical plate together form a sealed cavity; wherein the outer cylinder is provided with an intake hole, and the intake hole is connected by an intake pipe to the air supply device outside the outer cylinder; the inner cylinder randomly distributes a plurality of holes;
wherein a distance between the second vertical plate of the first blowing device and the second vertical plate of the second blowing device is X, and X is greater than 0; and
wherein the first vertical plate of the first blowing device is sleeved on the first spinneret, so that a jet ejected from the first spinneret enters the inner cylinder of the first blowing device; the first vertical plate of the second blowing device is sleeved on the second spinneret, so that a jet ejected from the second spinneret enters the inner cylinder of the second blowing device.

2. The flash evaporation/electrospinning composite spinning equipment of claim 1, wherein a wall thickness of the inner or outer cylinder is 0.1-0.3 m; the air supply device is used to provide an airflow with a pressure of 2-30 MPa; a diameter of the spinneret hole is 0.4-1 mm, and a number of the plurality of holes is 500-300.

3. The flash evaporation/electrospinning composite spinning equipment of claim 2, wherein the inner cylinder of the first blowing device is coaxial with the inner cylinder of the second blowing device, a distance between the second vertical plate of the first blowing device and the first spinneret is equal to a distance between the second vertical plate of the second blowing device and the second spinneret, and X is 30%-60% of D.

4. The flash evaporation/electrospinning composite spinning equipment of claim 1, wherein the electrospinning equipment further comprises a solvent atomization generator for atomizing a liquid solvent; wherein the second blowing device further comprises a plurality of partition plates, the plurality of partition plates are parallel to the first vertical plate of the second blowing device, and the plurality of partition plates divides the sealed cavity of the second blowing device into a plurality of sub-sealed cavities of a same size; wherein a number of the intake hole on the outer cylinder of the second blowing device is multiple, each sub-sealed cavity is connected to at least one of the intake hole, and the intake hole is equipped with an air volume controller, an air volume of the intake hole of each sub-sealed cavity gradually increases along a forward direction of the jet, wherein a number of the intake pipe is multiple, and the intake pipe respectively connected to the intake hole of each sub-sealed cavity is simultaneously connected to the solvent atomization generator.

5. The flash evaporation/electrospinning composite spinning equipment of claim 1, wherein the flash spinning equipment further comprises a polymer tank, a solvent tank, and a high-temperature and high-pressure reactor, wherein the polymer tank, the solvent tank, and the flash spinning spinneret unit are connected to the high-temperature and high-pressure reactor simultaneously.

6. The flash evaporation/electrospinning composite spinning equipment of claim 1, wherein the electrospinning equipment further comprises an electrospinning solution reservoir connected to the electrospinning spinneret unit.

7. The flash evaporation/electrospinning composite spinning equipment of claim 1, wherein a distance between the first spinneret or the second spinneret and the receiving conveyor belt is 10-60 cm.

8. The flash evaporation/electrospinning composite spinning equipment of claim 1, wherein the flash evaporation/electrospinning composite spinning equipment further comprises a hot-pressing upper roller and a hot-pressing lower roller located on upper and lower sides of the receiving conveyor belt.

* * * * *